United States Patent [19]
Le et al.

[11] Patent Number: 4,853,127
[45] Date of Patent: Aug. 1, 1989

[54] MICROPOROUS MEMBRANE

[75] Inventors: Minh S. Le, Gateshead; John S. Wilkes, South Shields, both of England

[73] Assignee: Domnick Hunter Ilblry Limited, Birtley, Great Britain

[21] Appl. No.: 127,796

[22] Filed: Dec. 2, 1987

[30] Foreign Application Priority Data

Dec. 3, 1986 [GB] United Kingdom ................. 8628938

[51] Int. Cl.$^4$ .............................................. B01D 13/00
[52] U.S. Cl. .................................. 210/500.39; 264/41
[58] Field of Search ............... 55/16; 210/500.39, 490, 210/500.23; 264/41, 48

[56] References Cited

U.S. PATENT DOCUMENTS

| | | | |
|---|---|---|---|
| 3,615,024 | 10/1971 | Michaels | 210/490 |
| 4,156,597 | 5/1979 | Browall | 55/70 X |
| 4,481,260 | 11/1984 | Nohmi | 210/500.23 X |
| 4,690,765 | 9/1987 | Cihobr et al. | 210/500.39 |

*Primary Examiner*—Frank Spear
*Attorney, Agent, or Firm*—Bert J. Lewen; Henry Sternberg

[57] ABSTRACT

A microporous membrane for use in filtration, the membrane being formed of a polyetherimide derived from an aromatic bis (ether anydride) and an organic diamine. The membrane is formed from a casting liquid comprising the polyetherimide together with a solvent and a non-solvent, forming a thin layer of the liquid and extracting at least part of the solvent and non-solvent to form the required membrane. The membrane may be modified by the inclusion of additional chemical moieties.

23 Claims, No Drawings

MICROPOROUS MEMBRANE

This invention relates to a microporous membrane for use in filtration, and to a method of forming a microporous membrane. Synthetic polymeric microporous membranes are now well-known for use in filtration, and there is abundant literature on the subject. The most comprehensive treatment is probably the work of R E Kesting, entitled "Synthetic Polymeric Membranes", published by the McGraw-Hill Book Company 1971. This discloses many different types of polymer from which such membranes can successfully be formed.

There is, however, a constant need for microporous membranes which have excellent chemical resistance to a wide range of materials and which also exhibit good physical properties such as high tensile strength, flexibility and thermal stability. The presently most used membrane materials are those such as cellulose esters, nylons and polysulphones, each of which are limited in either their chemical or physical properties or both.

According to the present invention a microporous membrane for use in filtration is formed of a polyetherimide derived from an aromatic bis (ether anhydride) and an organic diamine, and having the formula

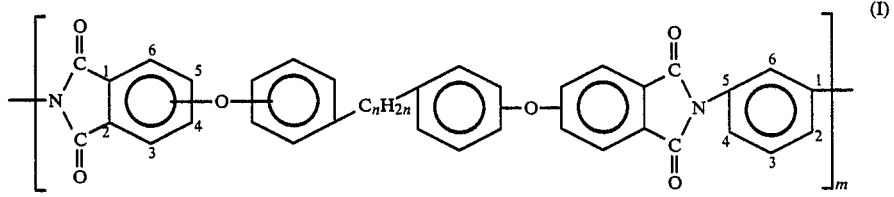

wherein n is an integer from 1 to 8, the positions of the oxygen atoms linking the phenylene and phthalimide rings are selected from the 3, 3'; 4, 4' or 3, 4' positions and mixtures thereof, and m is any integer.

Polyetherimides as set out above are, in themselves, known, being described for example in U.S. Pat. No. 3,847,867 and U.S. Pat. No. 3,991,004. Engineering polymer resins of polyetherimide have been marketed for many years under the registered trade mark ULTEM by the General Electric Co. Until now, however, the material has not been suggested for use as a microporous membrane. It has been found that membranes made from these materials, particularly the preferred polyetherimides as will hereafter be described, have excellent chemical resistance, including resistance to acid and base hydrolysis and resistance to a great number of organic solvents. In addition, the resins exhibit excellent physical properties, such as high tensile strength and toughness, good flexibility and dimensional stability over a range of temperatures from −10° C. to 175° C. They also maintain their strength over the same temperature range.

Preferably the aromatic bis (ether anhydride) is 2, 2 bis [4-(3, 4-dicarboxy phenoxy) phenyl] propane dianhydride (hereinafter abbreviated to BPADA). Desirably the organic diamine is either 4, 4 diamino diphenyl ether or metaphenylene diamine (hereinafter abbreviated respectively to ODA and m-PD).

In the preferred embodiment the polyetherimide is formed by reacting BPADA and m-PD to form a polymer represented by Formula 1 wherein the $C_nH_{2n}$ group is $C_3H_6$ and the oxygens linking the phenylene and phthalimide rings are in the 4, 4' positions.

The polyetherimide may have any suitable average molecular weight, desirably from about 10,000 to about 1,000,000, and preferably from about 20,000 to about 60,000 with the range of 30,000 to 40,000 being particularly preferred. Polymers of this type are sold in various forms under the registered trade mark ULTEM.

Microporous membranes according to the invention may be used as membrane filters in microfiltration or ultrafiltration. The membrane filters may be produced in the form of flat sheets or ribbons, in tubular form on either the inside or the outside of a supporting tube, in the form of hollow fibres or in the form of beaded particles. They may also be used in any filter construction designed to employ microporous membranes.

According to a particularly advantageous feature of the invention, the basic membrane is modified by having at least one additional chemical moiety grafted on to the polyetherimide by reaction with a carbonyl group thereof. The chemistry of carbonyl compounds is well known, and can be referenced from any standard organic chemistry text book such as "Organic Chemistry" by John McMurray published by Brook/Cole Publishing Company, 1984. Although the ability of carbonyl compounds to undergo a large number of different chemical reactions is well known, it is unexpected that the membranes of the invention can undergo these reactions without substantially altering the physical structure of the membrane.

The additional chemical moiety is desirably selected from HCN, amines, such as tetraethyl pentamine or polyethyleneimine and phosphorus ylides, such as methylenetriphenyl phosphorane and retinylidene triphenyl phosphorane. The basic schemes of the three reactions can be described as follows:

1. Addition of HCN:

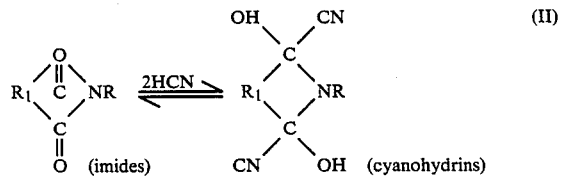

2. Addition of amines:

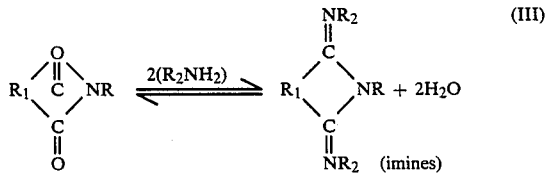

3. Addition of phosphorus ylides:

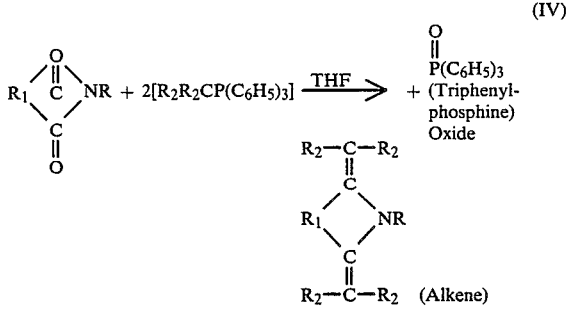

In a second type of modified membrane the polyetherimide is impregnated with a polymer which is immobilised within the porous structure of the polyetherimide by a cross linking agent. The polymer is preferably water-soluble, and is desirably either polyethyleneimine, polyamino-polyamine epichlorohydrin or a polyacrylamide.

The purpose of modifying the basic membrane is to make it more effective for its intended application. Thus, the membrane can be tailored to have particular chemical properties or particular utility in dealing with the filtration of given materials. For example, for the filtration of negatively charged particles such as silica or bacteria, it is beneficial to have a positively charged membrane.

According to another aspect of the invention a method of forming a microporous membrane for use in filtration comprises the steps of forming a casting liquid comprising (a) a polyetherimide derived from an aromatic bis (ether anhydride) and an organic diamine and having formula (I) above;

(b) a solvent for the polyetherimide; and (c) a non-solvent liquid that by itself cannot dissolve the polyetherimide;

forming a thin layer of the liquid; and extracting at least part of the solvent and non-solvent from the layer to form the required membrane.

Preferably the diamine is present in a concentration of up to 30% by weight of the polyetherimide. Preferably the polyetherimide is soluble to the extent of at least 1% by weight, desirably more than 10% by weight, in the solvent. Desirably, the non-solvent should be mutually soluble together with the polyetherimide to at least 0.5% by weight.

Preferably the non-solvent is soluble in the solvent and has a boiling point at least 20° C. higher than that of the solvent. The solvent will generally be extracted by evaporation, and the non-solvent may be leached from the cast film with a fluid which is a non-solvent for the polyetherimide. This leaves a microporous membrane which has excellent chemical and physical characteristics, the physical characteristics being varied by controlling the nature and amount of the solvent and the non-solvent as well as the process variables.

The phase inversion process for fabricating polymeric membranes is well known, and the broad principles of the process are discussed in Kesting's work "Synthetic Polymeric Membranes", referred to above. Briefly, the process consists, in the context of the present invention, of dissolving the polyetherimide and the non-solvent in a volatile solvent, desirably having a boiling point below about 150° C. and preferably below about 100° C., to form a casting liquid. The liquid is either cast onto a support or former to give a film of the desired shape, or is extruded or spun to produce a hollow fiber structure, and the solvents are evaporated from the solution. The casting process can either be a wet process which involves casting into a liquid bath, with partial evaporation occurring in the bath, or it may be a dry process that involves casting into a controlled atmosphere, generally with complete evaporation. If any of the non-solvent is incapable of evaporation under the casting conditions (eg. non-solvent having a boiling point in excess of 200° C.) then it may be leached from the cast film using a solvent which is also a non-solvent for the polyetherimide.

The process will obviously be designed to form the polymeric microporous membrane as required for a specific end use. For use in microfiltration an unskinned membrane having a pore size that does not vary by a factor of more than 10 over its entire thickness is preferred. For untrafiltration, a skinned membrane is preferred. Pore structure within the membrane may either be substantially symmetric or substantially asymmetric as is well known in the field of microporous membranes.

The selection of solvent in order to obtain a good membrane is important, and different solvents may be suitable for the dry process than for the wet process. Quite apart from considering the properties of the formed membranes, both flammability and toxicity are important considerations in solvent selection, as for commercial production it is obviously preferable to reduce hazards as far as possible. The preferred solvent used in the method of the invention is N-methylpyrrolidone, which satisfies all the requirements for a suitable phase in version solvent, even though it is relatively low in volatility. The implication of this is that requires the non-solvent to be a high boiling compound which remains in the nascent membrane together with a significant quantity of N-methylpyrrolidone after formation of the cast film. Residual solvent may then be removed from the resultant membrane by washing with water.

Other possible solvents that can be used are dimethyl formamide, dimethyl acetamide, dioxane and methylcarbonate.

Rather than use a single solvent, it is possible to employ solvent blends, certain of which may include N-methylpyrrolidone. The theory of solvent blending is known and described, for example in "Handbook of Solubility Parameters" by Allan F M Barton, published by CRC Press in 1983.

Suitable choice of non-solvent is as important as suitable choice of solvent. Selection of non-solvent is not only a function of the nature of the polyetherimide, but also of the way that non-solvent combines with the solvent in controlling or influencing the membrane formation. In general, the non-solvent must be a non-solvent for the polyetherimide but must be soluble in the solvent. Non-solvent tolerance requires that the polymer solution be able to contain within the formulation enough non-solvent (at reasonable processing temperature) to invert and form a microporous membrane of high void volume, that is a membrane with greater than sixty percent void volume. One of the functions of the non-solvent is that of being the pore former, ie. it is the presence of the non-solvent in the nascent membrane and the subsequent removal of the non-solvent that causes the pores to be formed in the membrane.

The preferred non-solvent in the method of the invention is one or more polyethylene glycols having molecular weights in the range of from about 200 to about 6,000. Particularly preferred is polyethylene glycol 400, which is a colourless, odourless liquid at room temperature, setting as a soft wax at about 5° C. It is soluble in water in all proportions and is also soluble in N-methylpyrrolidone. It is essentially a non-hazardous substance, and as a pore former, it is well tolerated in the polymer solution, and can be present in up to 30% by weight of the casting liquid.

Additional non-solvents, such as glycerol or water may also be included in the casting liquid. The liquid may also contain swelling agents such as polyvinyl pyrolidene or a polyvinyl alcohol, and/or modifying agents.

Membranes have been prepared by both the wet process and the dry process methods from casting liquids containing only polyetherimide, N-methylpyrrolidone and polyethylene glycol 400. An entire range of membranes from unskinned, open microporous membranes for microfiltration to skinned membranes ultrafiltration have been produced. In general, void volume of the membrane (usually measured by reference to the bubble point of the membrane) is controlled by the content of the non-solvent or pore forming material, and by the rate of transition of the casting liquid from sol to gel during the phase inversion process. Void volume increases with pore former content and with the speed of sol to gel transition. Control of these variables to achieve optimal porosity is well known in this field. Skin formation on microporous membranes is obtained most efficiently by the wet process, where the molecular weight cut off of the membrane is controlled by the temperature of the gelation bath into which the membrane is cast, and by the solvent content. However, membranes produced by the wet process tend to be less asymmetric in pore size through the membrane, as again is well understood in the field.

In general, during dry process membrane production the nominal pore size rating is controlled by the rate of evaporation and the original casting formulation. For a given formulation, optimal permeability giving high flow rates for given pore size rating is achieved by rapid desolvation during processing. This rapid desolvation also gives rise to increasing asymmetry ranging from 2:1 to 5:1 as evaporation loss increases. Again for a given formulation a pore size rating range of membranes can be produced according to the evaporative conditions applied.

It has already been mentioned that the basic membrane may be modified either by grafting an additional chemical moiety onto the polyetherimide by reaction with the carbonyl group thereof, or by impregnating the polyetherimide with a polymer which is immobilised within the porous structure of the polyetherimide by a cross linking agent.

The former method is desirably carried out by reacting the formed membrane with the additional chemical moiety, which becomes attached to the carbonyl groups by covalent bonding. In the preferred form of the second method the cross-linking agent is dissolved in the casting liquid, and after the extraction of solvent from the cast layer the membrane is impregnated with the polymer which becomes cross-linked in situ within the membrane structure. The cross-linking agent that is used should not affect the phase inversion process for membrane formation. The cross-linking reaction may be allowed to proceed normally, or may desirably be catalysed, for example with caustic or with heat.

In order that the invention may be better understood some examples of membranes and formation methods in accordance with the invention will now be described in more detail, by way of example only. In the examples the polyetherimide used is ULTEM 1000 from the General Electric Company. This is a polyetherimide of formula (I), wherein n equals 3 and m is between 5 and 100, the material being a mixture of molecular chains of varying length. The material is an amorphous, thermoplastic resin offering good mechanical strength and high heat resistence, with a glass transition temperature of 215° C. The excellent chemical resistance of this material may be summarised in the following table:

TABLE 1

Chemical Resistance Of Polyetherimide To Aqueous Solutions At 20° (100 Day Immersion)

| Chemical (Concentration) | % Retention Of Tensile Strength | % Weight Gain |
|---|---|---|
| Distilled Water | 94 | 1.18 |
| Citric acid (40%) | 96 | 1.06 |
| Hydrochloric acid (20%) | 99 | 0.61 |
| Phosphoric acid (20%) | 97 | 0.99 |
| Sulfuric acid (20%) | 97 | 0.89 |
| Chromic acid (15%) | 94 | 0.73 |
| Formic acid (10%) | 94 | 1.29 |
| Nitric acid (20%) | 96 | 1.07 |
| Acetic acid (20%) | 95 | 1.15 |
| Potassium hydroxide (10%) | 97 | 1.55 |
| Ammonium hydroxide (10%) | 68 | 1.79 |
| Sodium hydroxide (10%) | 97 | 1.00 |

TABLE 2

Resistance Of Polyetherimide To Organic Solvents (5 day immersion at 20° C.)

| Organic Chemicals | Resistance |
|---|---|
| Acetone | I |
| Butyl Alcohol | I |
| Carbon Tetrachloride | I |
| Chloroform | P |
| Cyclohexane | I |
| 1,3 Dioxolane | S |
| 1,4 Dioxane | S |
| Ethanol | I |
| 2-Ethoxyethanol (Cellosolve) | I |
| Ethyl Acetate | I |
| Ethyl Ether | I |
| Freon TF | I |
| Hexane | I |
| Isopropanol | I |
| Methanol | I |
| Methylene Dichloride | P |
| Methylethylketone | I |
| N.Methyl Pyrrolidone | S |
| Phenol (Saturated Solution) | I |
| Propylene Glycol | I |
| Tetrachloroethylene | I |
| Toluene | I |
| 1,1,2-Trichloroethane | P |
| Triethyphosphate | I |
| Xylene | I |

I = Insoluble
P = Partially Soluble
S = Soluble

EXAMPLE 1

A casting liquid of the following composition was prepared.

| ULTEM 1000 | 12 (% by weight) |
|---|---|
| N—methyl pyrrolidone | 68 |
| Polyethylene glycol 400 | 20 |

The solution was cast to a thickness of 350 micron on a sheet of polyethylene coated paper which was placed in an extraction tunnel. The solvent was allowed to evaporate in the tunnel at an air velocity of 450 ft per minute. The membrane formation was complete within 10 minutes.

EXAMPLE 2

The membrane in this example was prepared in an identical manner to that in Example 1, except that the casting liquid also contained 0.65% of an epoxy resin (polybed 812) based on the total weight of the solution. The epoxy resin was distributed substantially evenly throughout the membrane, and provided sites to which could be fixed other substances that would not react with the polyetherimide. For example, the epoxy resin could be used in fixing amine groups such as tetraethyl pentamine or polyethyleneimine.

EXAMPLE 3

The membrane in this example was prepared as in Example 1, except that after casting the liquid film which was supported by the paper, was gently lowered into a water bath at 3° C. whereupon the membrane was formed. The membrane was found to be effective in filtering out molecules with molecular weight greater than 90,000 dalton.

The membranes prepared from the above examples have the following characteristics:

|  | Bubble point | | Water flowrate* | Thickness (microns) | Ratio of Asymmetry |
|---|---|---|---|---|---|
|  | (psi) | (kPa) | | | |
| Example 1 | 57 | 393 | 20 | 87.5 | 3:1 |
| Example 2 | 50 | 345 | 15.4 | 75.0 | 3:1 |
| Example 3 | over 100 | over 690 | 0.12 | 80 | Skinned |

*in ml/cm$^2$/min at 69 kPa (10 psi) differential pressure

Membranes made in accordance with Example 1 were tested in comparison with conventional membranes of similar bubble point, made respectively from Nylon 66 and from mixed cellulose esters. The following properties were noted:

| Properties | Polyetherimide | Nylon 66 | Mixed Esters Cellulose |
|---|---|---|---|
| Bubble point (psi) | 50–57 | 60 | 60 |
| Nominal pore size | 0.2μ | 0.2μ | 0.2μ |
| Working pH | 1–10 | 4–12 | 4–8 |
| Working temperature (°C.) | 0–150 | 0–130 | 0–121 |
| Burst strength (psi) | 70 psi* | 15 psi | 44 psi |
| Stability in 1 M HCl | Stable | Dissolved | Dissolved |
| Stability in 1 M NaOH | Swell but intact | Stable | Dissolved |
| Creepage | Low | Moderate | High |
| Brittleness | Flexible | Flexible | Very brittle |

*Corrected for thickness

The superior properties of the membranes of the invention will be readily appreciated.

EXAMPLE 4

The membrane from Example 1 was modified by immersing it in an aqueous solution containing 1 mole per liter of tetraethylpentamine at pH5 and 20° C. for 6 hours after which the membrane was transferred to a solution of sodium borohydride (0.2 molar) pH9 for a further 6 hours. The membrane which has been modified in this manner showed considerable improvement in its resistance to chlorinated solvents and alkaline. It also acquired the ability to wet out instantly upon contact with water without the aid of any wetting agent or humectant.

EXAMPLE 5

The membrane from Example 2 was modified by impregnating it with a solution containing 10% by weight of polyethyleneimide (molecular weight 40,000–70,000) in water then allowed to cure at room temperature for 24 hours. The membrane so modified contained a high level of secondary amine groups which are amenable for further grafting of other reactive groups.

EXAMPLE 6

The membrane from Example 5 was further modified by impregnating it with a solution of 10% polyamidopolyamine epichlorohydrin resin in water pH11 and allowed to cure at 50° C. for 6 hours. The resin employed was supplied by Hercules Inc under the tradename Polycup 1884. The membrane modified in this manner showed improved retentivity for *Pseudomonas diminuta*, compared with the membranes of the other Examples.

It will be understood that these examples illustrate only some of the membranes of the invention and that by suitable selection of materials and suitable control of the evaporation and other casting conditions, a wide range of membranes may be formed. The actual physical form of the finished membrane can be as required for the projected end use, and the membranes may be generally take the form of any large surface area bodies, such as for example sheets, ribbons, tubes, hollow fibres or beaded particles.

We claim:

1. A microporous membrane for use in filtration, the membrane being self-supporting formed of a polyetherimide derived from an aromatic bis (ether anhydride) and an organic diamine, and having the formula

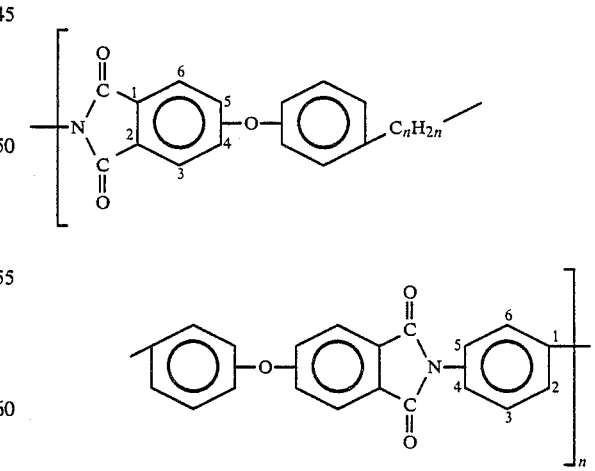

wherein n is an integer from 1 to 8, the positions of the oxygen atoms linking the phenylene and phthalimide rings are selected from the 3,3'; 4,4' or 3,4' positions and mixtures thereof, and m is any integer; and containing a void volume of at least 60%.

2. A membrane according to claim 1 in which the aromatic bis (ether anhydride) is 2,2 bis [4-(3,4-dicarboxy phenoxy) phenyl] propane dianhydride.

3. A membrane according to claim 1 in which the organic diamine is selected from 4,4 diamino diphanyl ether and meta phenylene diamine.

4. A membrane according to claim 1 in which the average molecular weight of the polyetherimide is from about 10,000 to about 100,000.

5. A membrane according to claim 1 in which the average molecular weight of the polyetherimide is from about 20,000 to about 60,000.

6. A membrane according to claim 1, in which at least one additional chemical moiety is grafted onto the polyetherimide by reaction with a carbonyl group thereof.

7. A membrane according to claim 6 in which the additional chemical moiety is selected from HCN, amines and phosphorus ylides.

8. A membrane according to claims 1 in which the polyetherimide is impregnated with a polymer which is immobilised within the porous structure of the polyetherimide by a crosslinking agent.

9. A membrane according to claim 8 in which the polymer is a water-soluble polymer.

10. A membrane according to claim 9 in which the polymer is selected from polyethyleneimine and polyamidopolyamine epichlorohydrin.

11. A method of forming a self-supporting microporous membrane for use in filtration and having a void volume of at least 60%, the method comprising the steps of forming a casting liquid comprising (a) a polyetherimide derived from an aromatic bis (ether anhydride) and an organic diamine, and having the formula

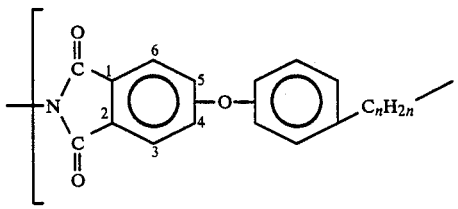

-continued

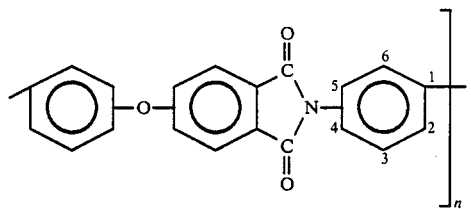

wherein n is an integer from 1 to 8, the positions of the oxygen atoms linking the phenylene and phthalimide rings are selected from the 3,3'; 4,4' or 3,4' positions and mixtures thereof, and m is any integer;

(b) a solvent for the polyetherimide; and (c) non-solvent liquid that by itself cannot dissolve the polyetherimide;

forming a thin layer of the liquid; and extracting at least part of the solvent and non-solvent from the layer to form the required membrane.

12. A method according to claim 11 in which the aromatic bis (ether anhydride) is 2,2 bis [4-(3,4-dicarboxy phenoxy) phenyl] propane dianhydride.

13. A method according to claim 11 in which the organic diamine is selected from 4,4 diamino diphenyl ether and meta phenylene diamine.

14. A method according to claim 11 in which the average molecular weight of the polyetherimide is from about 10,000 to about 100,000.

15. A method according to claim 11 in which the average molecular weight of the polyetherimide is from about 20,000 to about 60,000.

16. A method according to claim 11 in which the non-solvent is soluble in the solvent and has a boiling point at least 20° C. higher than that of the solvent.

17. A method according to claim 11 in which the solvent is N-methyl pyrrolidone.

18. A method according to claim 11 in which the non-solvent is polyethylene glycol having a molecular weight of from about 200 to about 6,000.

19. A method according to claim 11 in which at least one additional chemical moiety is grafted onto the polyetherimide by reaction with a carbonyl group thereof.

20. A method according to claim 19 in which the grafting is by an addition reaction and the additional chemical moiety is selected from HCN, amines and phosphorous ylides.

21. A method according to claim 11 in which the polyetherimide is impregnated with a polymer which is immobilised within the porous structure of the polyetherimide by a cross-linking agent.

22. A method according to claim 21 in which the cross-linking agent is dissolved in the casting liquid, and after the extraction of solvent from the cast layer the membrane is impregnated with the polymer which becomes cross-linked in situ within the membrane structure.

23. A method according to claim 22 in which the polymer is selected from polyethyleneimine and polyamidopolyamine epichlorohydrin.

* * * * *

UNITED STATES PATENT AND TRADEMARK OFFICE
CERTIFICATE OF CORRECTION

PATENT NO. : 4,853,127

DATED : August 1, 1989

INVENTOR(S) : Minh S. Le and John S. Wilkes

It is certified that error appears in the above-identified patent and that said Letters Patent is hereby corrected as shown below:

Cover page, item [73]: correct the name of the Assignee to "Domnick Hunter Filters Limited".

Column 1, line 52: cancel "resins" and substitute --membranes--.

Column 2, line 3: cancel "1,000,000" and substitute --100,000--.

Column 4, line 34: cancel "in version" and substitute --inversion--.

Column 5, line 20: after "skinned membranes" insert

Column 6, line 11: cancel "resistence" and substitute --resistance--.

Column 8, line 11: cancel "polyethyleneimide" and substitute --polyethyleneimine--; line 35: delete "be".

Column 9, claim 3, line 2: cancel "diphanyl" and substitute --diphenyl--.

Column 10, claim 21, line 2: after "polyetherimide" insert --membrane--.

Signed and Sealed this

Ninth Day of July, 1991

Attest:

HARRY F. MANBECK, JR.

*Attesting Officer*  *Commissioner of Patents and Trademarks*